(12) United States Patent
Minamiguchi

(10) Patent No.: US 12,215,976 B2
(45) Date of Patent: Feb. 4, 2025

(54) ESTIMATION DEVICE, ESTIMATION METHOD, PROGRAM PRODUCT FOR ESTIMATION

(71) Applicant: DENSO CORPORATION, Kariya (JP)

(72) Inventor: Yuuichi Minamiguchi, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/663,810

(22) Filed: May 17, 2022

(65) Prior Publication Data

US 2022/0276054 A1    Sep. 1, 2022

Related U.S. Application Data

(63) Continuation of application No. PCT/JP2020/036370, filed on Sep. 25, 2020.

(30) Foreign Application Priority Data

Nov. 21, 2019    (JP) .................... 2019-210764

(51) Int. Cl.
*G01C 21/16*    (2006.01)
*B60W 40/068*    (2012.01)
(Continued)

(52) U.S. Cl.
CPC ......... *G01C 21/188* (2020.08); *B60W 40/068* (2013.01); *B60W 40/103* (2013.01);
(Continued)

(58) Field of Classification Search
CPC .............. G01C 21/188; G01C 21/32; B60W 40/068; B60W 40/103
See application file for complete search history.

(56) References Cited

U.S. PATENT DOCUMENTS 6,360,165 B1 * 3/2002 Chowdhary ........... G01C 21/28
701/530
9,273,966 B2 * 3/2016 Bartels .................. G01C 21/12
(Continued)

FOREIGN PATENT DOCUMENTS

JP    2008-249639 A    10/2008
JP    5016246 B2 *    9/2012
(Continued)

OTHER PUBLICATIONS

"Carlson, Christopher; Estimation With Applications for Automobile Dead Reckoning and Control; Apr. 2004; Stanford University" (Year: 2004).*
"Martucci, Francisco; On-board recursive state estimation for dead-reckoning in an autonomous truck; 2014; KTH Electrical Engineering" (Year: 2014).*

*Primary Examiner* — Elaine Gort
*Assistant Examiner* — Christopher R Cardimino
(74) *Attorney, Agent, or Firm* — Maschoff Brennan

(57) ABSTRACT

An estimation includes a dead reckoning unit, a map matching unit, and a parameter correction unit. The dead reckoning unit is configured to estimate a state quantity by dead reckoning based on (i) a dynamics model including a parameter that changes a behavior of the vehicle and (ii) internal information acquired from an inside of the vehicle. The map matching unit is configured to observe the state quantity by map matching based on (i) map information indicative of a traveling environment of the vehicle and (ii) external information acquired from an outside of the vehicle. The parameter correction unit is configured to correct the parameter, which is to be fed back for the dead reckoning, based on an offset amount that is a difference between the state quantity observed by the map matching and the state quantity estimated by the dead reckoning.

16 Claims, 11 Drawing Sheets

(51) Int. Cl.
*B60W 40/103* (2012.01)
*G01C 21/32* (2006.01)
(52) U.S. Cl.
CPC ......... *G01C 21/32* (2013.01); *B60W 2520/20* (2013.01); *B60W 2552/40* (2020.02); *B60W 2556/40* (2020.02)

(56) References Cited

U.S. PATENT DOCUMENTS

| | | | |
|---|---|---|---|
| 9,921,065 B2 * | 3/2018 | Brannstrom | G05D 1/0274 |
| 2006/0106533 A1 | 5/2006 | Hirokawa | |
| 2007/0244640 A1 | 10/2007 | Hirokawa | |
| 2011/0208424 A1 * | 8/2011 | Hirsch | G01C 21/165 |
| | | | 701/532 |
| 2011/0257882 A1 * | 10/2011 | McBurney | G01S 19/47 |
| | | | 701/532 |
| 2016/0146616 A1 * | 5/2016 | Ren | G01C 21/165 |
| | | | 701/409 |
| 2018/0188031 A1 * | 7/2018 | Samper | G05D 1/0272 |

FOREIGN PATENT DOCUMENTS

| | | | | |
|---|---|---|---|---|
| JP | 2013075632 A | * | 4/2013 | |
| JP | 2013-088208 A | | 5/2013 | |
| JP | 2017-219429 A | | 12/2017 | |
| KR | 20130057114 A | * | 5/2013 | |
| WO | WO-2014149044 A1 | * | 9/2014 | ............ B60W 30/14 |

* cited by examiner

ESTIMATION DEVICE, ESTIMATION METHOD, PROGRAM PRODUCT FOR ESTIMATION

CROSS REFERENCE TO RELATED APPLICATION

The present application is a continuation application of International Patent Application No. PCT/JP2020/036370 filed on Sep. 25, 2020, which designated the U.S. and claims the benefit of priority from Japanese Patent Application No. 2019-210764 filed on Nov. 21, 2019. The entire disclosures of all of the above applications are incorporated herein by reference.

TECHNICAL FIELD

The present disclosure relates to an estimation technique for estimating a state quantity of a vehicle.

BACKGROUND

State quantities including a position of a vehicle can be estimated by dead reckoning based on internal information acquired from an inside of the vehicle. In an example of such estimation technique, Kalman filter based on an equation of state that is a dynamics model is used for correcting navigation errors in the estimation results of the dead reckoning.

SUMMARY

According to a first aspect of the present disclosure, an estimation configured to estimate a state quantity including a position of a vehicle includes a dead reckoning unit, a map matching unit, and a parameter correction unit. The dead reckoning unit is configured to estimate a state quantity by dead reckoning based on (i) a dynamics model including a parameter that changes a behavior of the vehicle and (ii) internal information acquired from an inside of the vehicle. The map matching unit is configured to observe the state quantity by map matching based on (i) map information indicative of a traveling environment of the vehicle and (ii) external information acquired from an outside of the vehicle. The parameter correction unit is configured to correct the parameter, which is to be fed back for the dead reckoning, based on an offset amount that is a difference between the state quantity observed by the map matching and the state quantity estimated by the dead reckoning.

According to a second aspect of the present disclosure, a method of estimating a state quantity including a position of a vehicle includes: estimating the state quantity by dead reckoning based on (i) a dynamics model including a parameter that changes a behavior of the vehicle and (ii) internal information acquired from an inside of the vehicle; observing the state quantity by map matching based on (i) map information indicative of a traveling environment of the vehicle and (ii) external information acquired from an outside of the vehicle; and correcting the parameter, which is to be fed back for the dead reckoning, based on an offset amount that is a difference between the state quantity observed by the map matching and the state quantity estimated by the dead reckoning.

According to a third aspect of the present disclosure, a computer program product is for estimating a state quantity including a position of a vehicle. The computer program product is stored on a non-transitory computer readable medium and includes instruction configured to, when executed by at least one processor, cause the at least one processor to: estimate the state quantity by dead reckoning based on (i) a dynamics model including a parameter that changes a behavior of the vehicle and (ii) internal information acquired from an inside of the vehicle; observe the state quantity by map matching based on (i) map information indicative of a traveling environment of the vehicle and (ii) external information acquired from an outside of the vehicle; and correct the parameter, which is to be fed back for the dead reckoning, based on an offset amount that is a difference between the state quantity observed by the map matching and the state quantity estimated by the dead reckoning.

EMBODIMENTS

Comparative Example

In a comparative example of an estimation technique, Kalman filter based on an equation of state that is a dynamics model is used for correcting navigation errors in the estimation results of the dead reckoning. In this example, when an error occurs in a parameter contained in the dynamics model and causing a change of the vehicle behavior, accuracy in the dead reckoning may decrease. In the parameter causing the change of the vehicle behavior, a change due to factors other than the vehicle behavior, such as a road surface condition, may be the error. Such error in the parameter may not be corrected or compensated accurately by the Kalman filter, and decrease the accuracy in the estimation of the state quantity.

Hereinafter, an embodiment of the present disclosure will be described with reference to the drawings.

Figure 1:
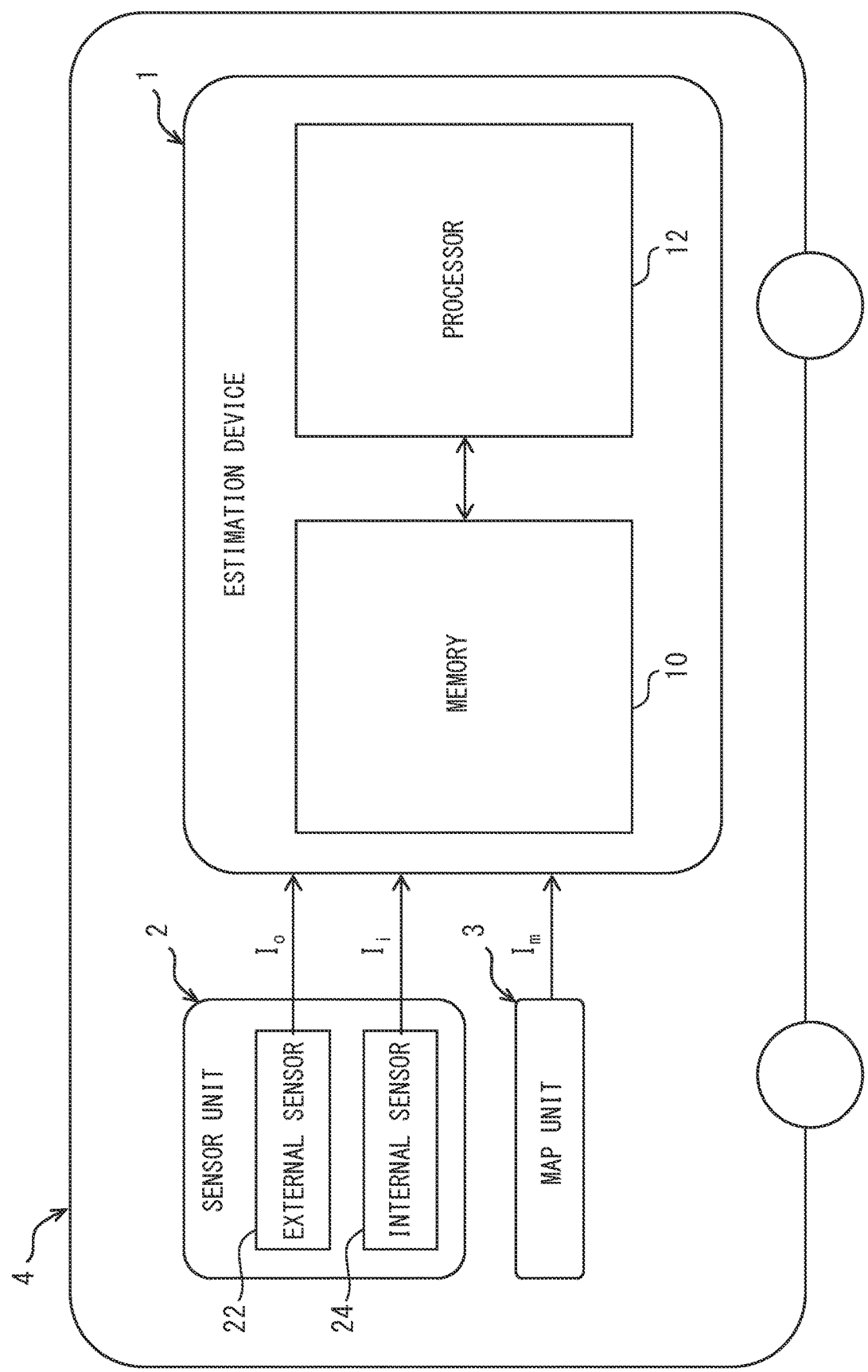
FIG. 1 is a block diagram showing an overall configuration of an estimation device according to an embodiment.
Figure 2:
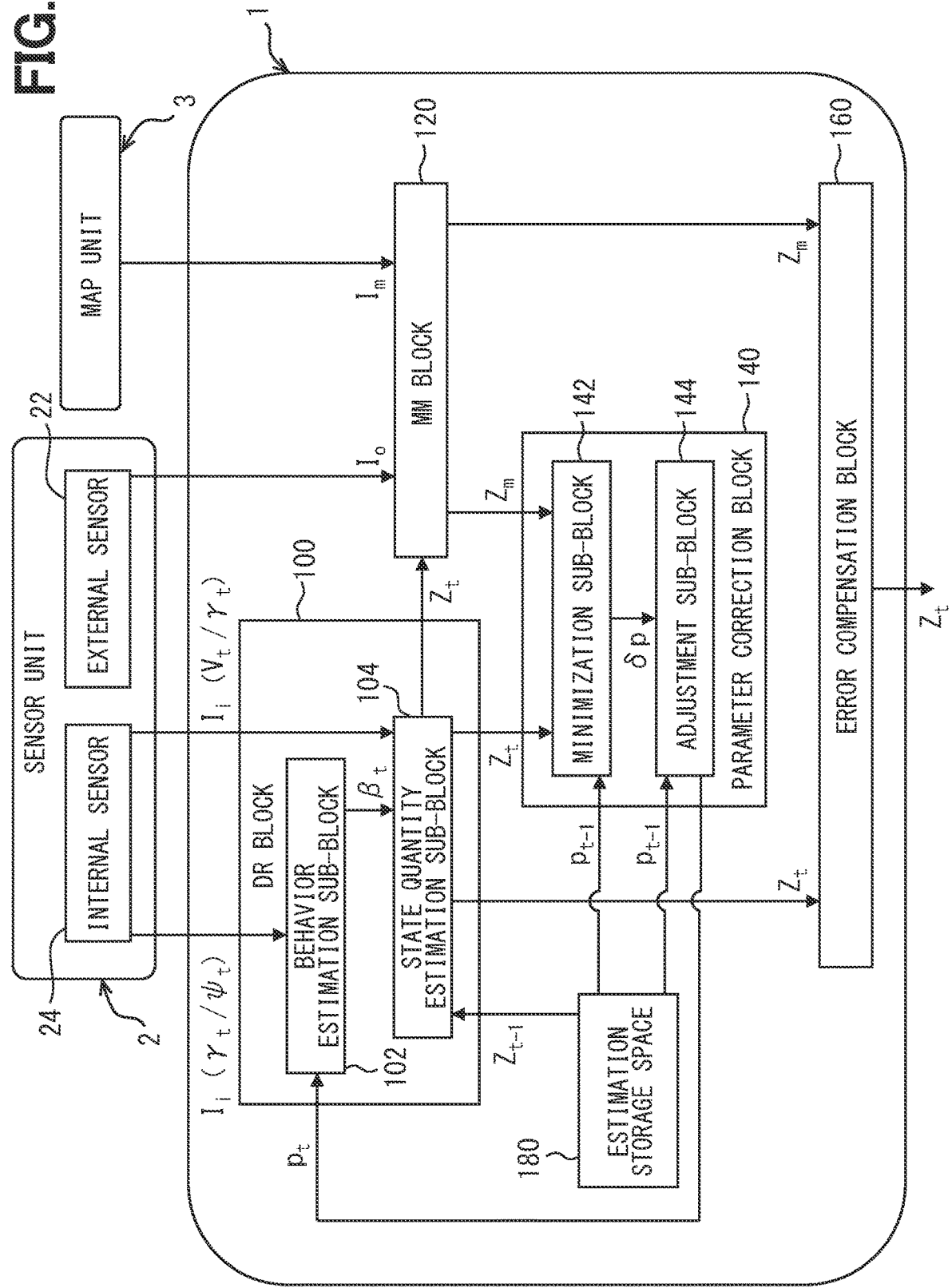
FIG. 2 is a block diagram showing a detailed configuration of the estimation device according to the embodiment.

As shown in FIGS. 1, 2, an estimation device 1 is mounted on a vehicle 4 together with a sensor unit 2 and a map unit 3. The sensor unit 2 includes an external sensor 22 and an internal sensor 24.

The external sensor 22 acquires information usable for motion estimation of the vehicle 4 as external information Io from an outside, which is a surrounding environment of the vehicle 4. The external sensor 22 may acquire the external information Io by detecting an object existing in the outside of the vehicle 4. The external sensor 22 of the detection type includes one or some of a camera, a LiDAR (Light Detection and Ranging/Laser Imaging Detection and Ranging), a radar, a sonar, and the like, for example. The external sensor 22 may acquire the external information Io by receiving signals from a wireless communication system existing in the outside of the vehicle 4. The external sensor 22 of the reception type includes one or some of a receiver of GNSS (Global Navigation Satellite System), a receiver of ITS (Intelligent Transport Systems), and the like. Hereinafter, in the following description, a LiDAR configured to detect reflected light of the emitted light reflected from the reflection point and generate a point cloud image is mounted on the vehicle 4 as the external sensor 22.

The internal sensor 24 acquires, as internal information Ii, information usable for the motion estimation of the vehicle 4 from an inside, which is the internal environment of the vehicle 4. The internal sensor 24 may acquire the internal information Ii by detecting a specific motion physical quantity in the inside of the vehicle 4. The internal sensor 24 of the detection type includes one or some of an inertial sensor, a vehicle speed sensor, a steering angle sensor, and the like. Hereinafter, as the internal sensor 24, at least a gyro sensor that is an inertial sensor detecting an angular velocity of the vehicle, a vehicle speed sensor detecting a speed of the vehicle, and the steering angle sensor detecting an angle of the wheel relative to the vehicle are mounted on the vehicle 4.

The map unit 3 includes one or some non-transitory tangible storage medium, such as a semiconductor memory, a magnetic medium, and an optical medium, for non-transitory storage of map information Im. The map unit 3 may be a database of a locator used for an advanced driver assistance or an automated driving of the vehicle 4. The map unit 3 may be a database of a navigation device for navigating the driving of the vehicle 4. The map unit 3 may be a combination of such databases.

The map information Im is a two or three-dimensional data indicating a traveling environment of the vehicle 4. The map information Im includes one or some of a position, a shape, a surface state, and the like of the road. The map information Im may include road sign information indicating one or some of positions, shapes, and the like of a road sign and a road line. The map information Im may include a structure information indicating one or some of positions, shapes, and the like of a structure and a traffic signal facing a road.

As shown in FIG. 1, the estimation device 1 is connected with the sensor unit 2 and the map unit 3 through one or some of LAN (Local Area Network), a wire harness, an internal bus, or the like. The estimation device 1 includes at least one dedicated computer. The dedicated computer of the estimation device 1 may be an ECU (Electronic Control Unit) dedicated to driving control and configured to perform the advanced driver assistance or the automated driving of the vehicle 4. The dedicated computer of the estimation device 1 may be an ECU of the locator used for the advanced driver assistance or the automated driving of the vehicle 4. The dedicated computer of the estimation device 1 may be an ECU of the navigation device configured to navigate the driving of the vehicle 4. The dedicated computer of the estimation device 1 may be an ECU of a communication control device configured to control the communication between the vehicle 4 and the outside.

The estimation device 1 including such dedicated computer has at least one memory 10 and at least one processor 12. The memory 10 is one or some non-transitory tangible storage medium, such as a semiconductor memory, a magnetic storage medium, and an optical storage medium, for non-transitory storing computer readable programs and data. The processor 12 includes, as a core, one or some of, for example, a CPU (Central Processing Unit), a GPU (Graphics Processing Unit), an RISC (Reduced Instruction Set Computer) CPU, and so on. The processor 12 executes multiple instructions included in an estimation program stored in the memory 10. Accordingly, the estimation device 1 includes functional blocks for estimating a state quantity including the position of the vehicle 4, as shown in FIG. 2. As described above, in the estimation device 1, the functional blocks are built by causing the processor 12 to execute multiple instructions of the estimation program stored in the memory 102 for estimating the state quantity of the vehicle 4.

The functional blocks of the estimation device 1 includes a dead reckoning block 100, a map matching block 120, a parameter correction block 140, and an error compensation block 160. The dead reckoning block 100 is configured to estimate the state quantity of the vehicle 4 by the dead reckoning based on a dynamics model DM and the internal information Ii. The dead reckoning block 100 includes a behavior estimation sub-block 102 and a state quantity estimation sub-block 104. The dead reckoning may be referred to as DR in the following description.

Figure 3:
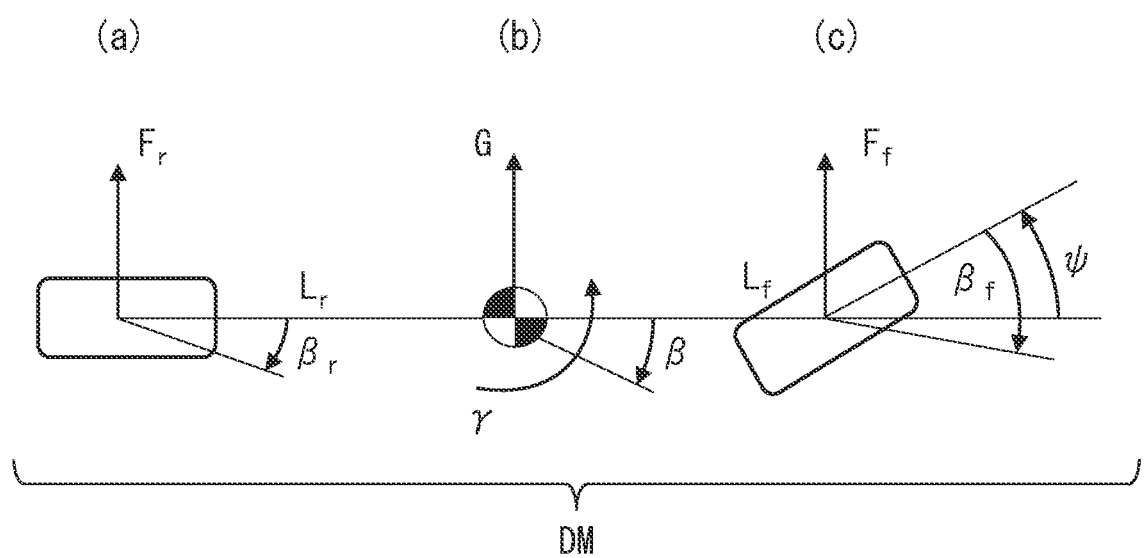
FIG. 3 is a schematic diagram for explaining a dead reckoning block according to the embodiment.

The behavior estimation sub-block 102 is configured to estimate, based on the dynamics model DM shown in FIG. 3, a behavior of the vehicle 4 (vehicle behavior) that is a driving state of the vehicle 4 at a latest time t. Specifically, the dynamics model DM is a model of the vehicle behavior based on dynamics, such as a two-wheel model. The dynamics model DM is configured to estimate a slip angle $\beta$ as a motion physical quantity specifying the vehicle behavior. In FIG. 3, $\gamma$ is the angular velocity and $\psi$ is the steering angle. In FIG. 3, F is a side force, G is a lateral acceleration, and L is a wheelbase of the vehicle 4. In FIG. 3, 'r' attached to $\beta$, F, and L is a suffix representing an element of a rear model of the vehicle 4. In FIG. 3, 'f' attached to $\beta$, F, and L is a suffix representing an element of a front model of the vehicle 4.

The angular velocity $\gamma t$ and the angular velocity $\psi t$ included in the internal information Ii acquired by the internal sensor 24 at the latest time t are input to the behavior estimation sub-block 102 shown in FIG. 2. A dynamic parameter pt with respect to the latest time t, which is corrected and fed back by the parameter correction block 140, is input to the behavior estimation sub-block 102. The dynamic parameter pt includes one or some of physical quantities varies due to factors other than the vehicle behavior. The dynamic parameter pt of the present embodiment includes at least the kinetic friction coefficient of the road surface on which the vehicle 4 is traveling. In addition to the kinetic friction coefficient, the dynamic parameter pt may include the weight of the vehicle 4 including the weight of the occupants.

The dynamic parameter pt input to the behavior estimation sub-block 102 in addition to the angular velocity $\gamma t$ and the steering angle $\psi t$ causes, depending on the change of the dynamic parameter pt, the change in the slip angle $\beta t$ that is the vehicle behavior estimated for the latest time t by the dynamics model DM of the present embodiment. In view of the above, the behavior estimation sub-block 102 is configured to calculate to estimate the slip angle βt of the latest time t using the following formula 1 that is the model function Md based on the dynamics model DM and including the dynamic parameter pt in addition to the angular velocity γt and the steering angle ψt as variables.

$$\beta_t = M_d(\gamma_t, \psi_t, p_t) \quad \text{(Formula 1)}$$

The state quantity estimation sub-block 104 shown in FIG. 2 is configured to estimate the state quantity Zt of the vehicle 4 of the latest time t depending on the estimation result by the behavior estimation sub-block 102 using the dynamics model DM. Specifically, the state quantity Zt at the latest time t is defined by the following formula 2 that is a vector function using the two-dimensional coordinate positions xt, yt, and the yaw angle θt.

$$Z_t = \begin{bmatrix} x_t \\ y_t \\ \theta_t \end{bmatrix} \quad \text{(Formula 2)}$$

Figure 4:
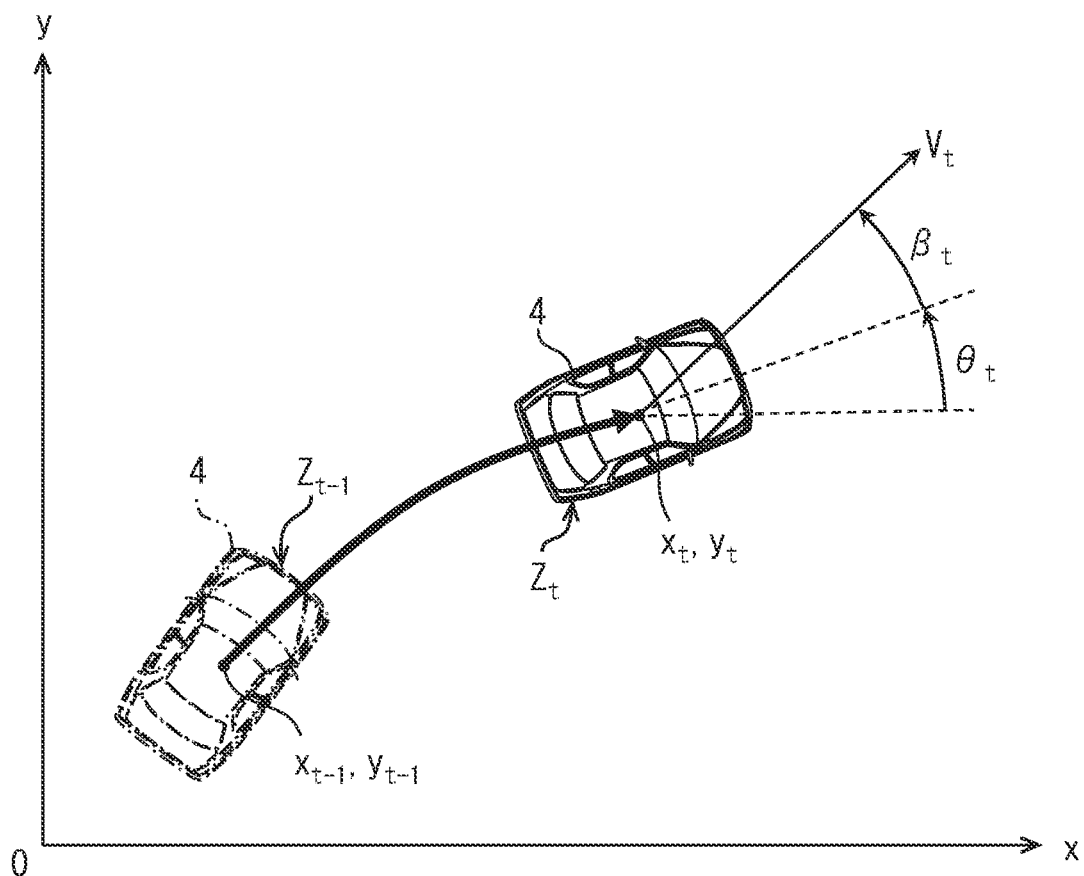
FIG. 4 is a schematic diagram for explaining the dead reckoning block according to the embodiment.

As shown in FIG. 4, the two-dimensional coordinate positions xt, yt included in the state quantity Zt at the latest time t is expressed by the following formulas 3, 4 which are linear functions using the two-dimensional coordinate positions xt−1, yt−1 of the preceding estimation time t−1. In the formulas 3, 4, βt is the slip angle at the latest time t estimated by the behavior estimation sub-block 102. In the formulas 3, 4, Vt is the vehicle speed of the vehicle 4. In the formulas 3, 4, θt is the yaw angle included in the state quantity Zt of the latest time t. The yaw angle θt is expressed by the following formula 5 using the yaw angle θt−1 at the preceding estimation time t−1. In the formulas 3, 4, 5, Δt is the difference between the latest time t and the preceding estimation time t−1, that is, the estimation interval. In the formula 5, γt is the angular velocity of the vehicle 4 at the latest time t.

$$x_t = x_{t-1} + V_t \cdot \Delta t \cdot \cos(\theta_t + \beta_t) \quad \text{(Formula 3)}$$

$$y_t = y_{t-1} + V_t \cdot \Delta t \cdot \sin(\theta_t + \beta_t) \quad \text{(Formula 4)}$$

$$\theta_t = \theta_{t-1} + \gamma_t \cdot \Delta t \quad \text{(Formula 5)}$$

The vehicle speed Vt and the angular velocity γt included in the internal information Ii acquired by the internal sensor 24 at the latest time t are input to the state quantity estimation sub-block 104 as shown in FIG. 2. The slip angle βt at the latest time t estimated by the behavior estimation sub-block 102 using the dynamics model DM is input to the state quantity estimation sub-block 104. Additionally, the state quantity Zt−1 stored in association with the preceding estimation time t−1 is read out from the storage space 180 in the memory 10 and input to the state quantity estimation sub-block 104. The state quantity estimation sub-block 104 calculates to estimate, based on the above inputs, the two-dimensional coordinate positions xt, yt, and the yaw angle θt of the state quantity Zt by assigning the formulas 3, 4, 5 to the formula 2. The state quantity estimation sub-block 104 stores the current estimation result to the storage space 180 in association with the latest time t.

Figure 5:
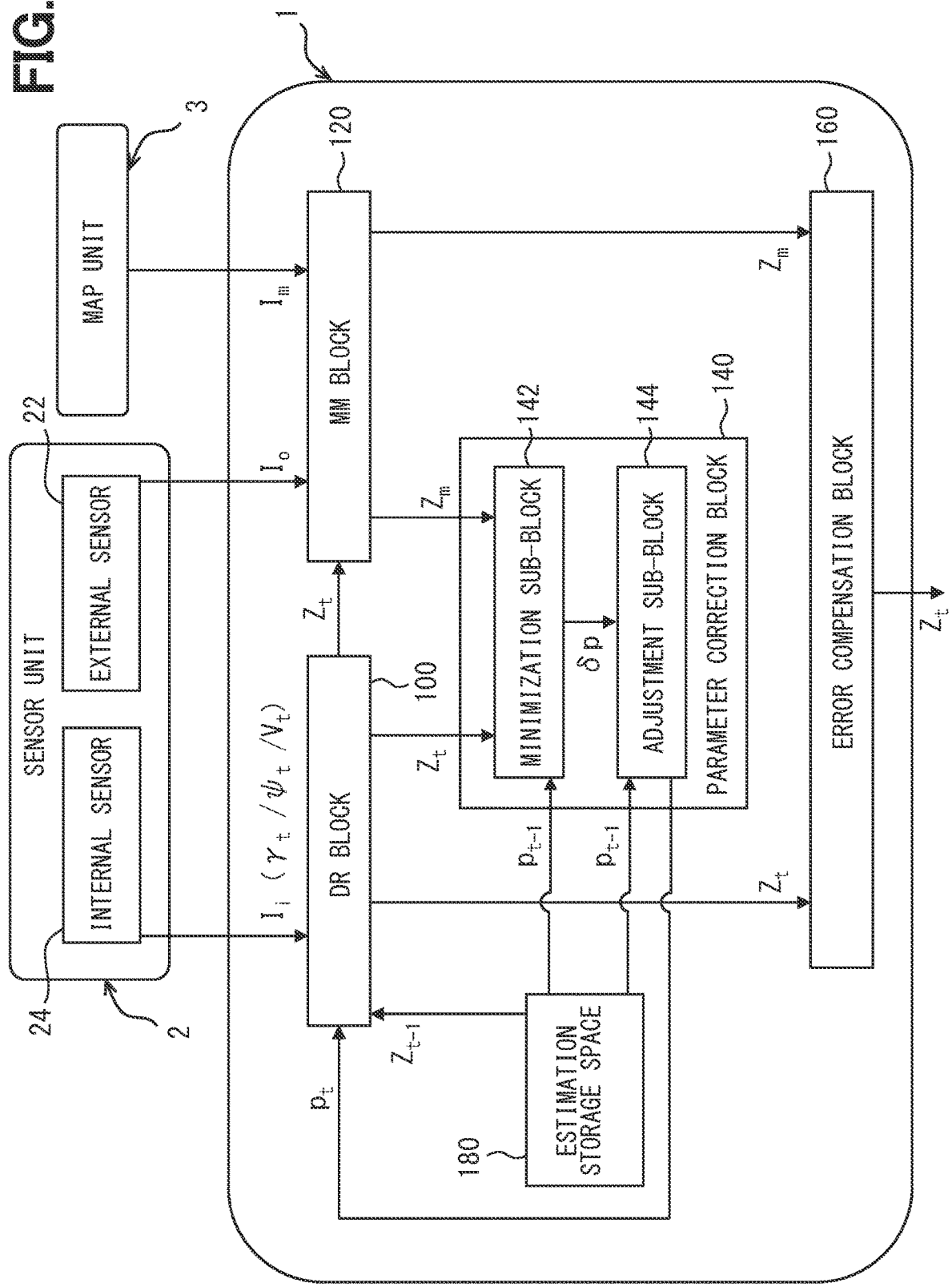
FIG. 5 is a block diagram showing a detailed configuration of an estimation device according to one modification example of the embodiment.

The second term on the right side of the formula 3 to which the formula 1 is assigned, the second term on the right side of the formula 4 to which the formula 1 is assigned, and the second term on the right side of the formula 5 are summarized in ΔZ of the following formula 6 that is a vector function including an estimated change amount of the state quantity in an estimation interval Δt. The formula 6 defines the change amount function ΔZ including the dynamic parameter pt as a variable by using the model function Md of the dynamics model DM that expresses the slip angle βt. Accordingly, the state quantity Zt of the latest time t can be expressed by the following formula 7 using the state quantity Zt−1 of the preceding estimation time t−1 and the change amount function ΔZ of the latest time t. As a modification example shown in FIG. 5, the DR block 100 may estimate the two-dimensional coordinate positions xt, yt, and the yaw angle θt of the state quantity Zt of the formula 7 to which the formula 6 is assigned, based on the inputs of the angular velocity γt, the steering angle ψt, the vehicle speed Vt, the dynamic parameter pt, and the preceding state quantity Zt−1 without calculating the slip angle βt.

$$\Delta Z(p_t) = \begin{bmatrix} V_t \cdot \Delta t \cdot \cos\{\theta_t + Md(\gamma_t, \psi_t, p_t)\} \\ V_t \cdot \Delta t \cdot \sin\{\theta_t + Md(\gamma_t, \psi_t, p_t)\} \\ \gamma_t \cdot \Delta t \end{bmatrix} \quad \text{(Formula 6)}$$

$$Z_t = Z_{t-1} + \Delta Z(p_t) \quad \text{(Formula 7)}$$

The map matching block 120 shown in FIG. 2 is configured to observe the state quantity of the vehicle 4 by map matching based on the map information Im and the external information Io. The map matching may be referred to as MM (Map Matching).

Figure 6:
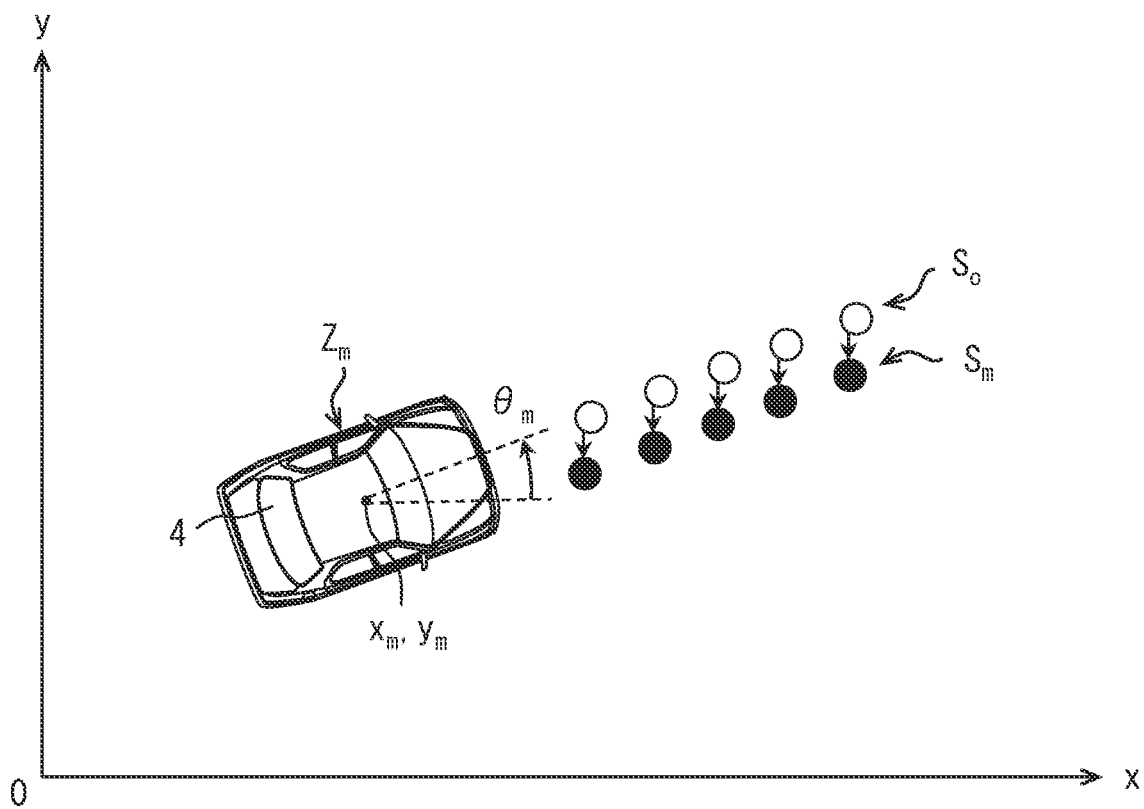
FIG. 6 is a schematic diagram for explaining a map matching block according to the embodiment.

Specifically, the state quantity Zt at the latest time t estimated by the DR block 100 is input to an MM block 120. The map information Im corresponding to the two-dimensional coordinate positions xt, yt of the input state quantity Zt is read out from the map unit 3 and input to the MM block 120. A point cloud image acquired at the latest time t by the LiDAR included in the external sensor 22 is input to the MM block 120 as the external information Io. Based on these inputs, the MM block 120 extracts, from the map information Im, feature points Sm which match the observed points So of the external objects observed in the point cloud image, as shown in FIG. 6. In FIG. 6, the observed points So are illustrated with while circles, and the feature points Sm are illustrated with black circles.

The MM block 120 is configured to observe the state quantity Zm of the vehicle 4 at the latest time t based on the feature points Sm which match the observed points So. The MM block 120 is configured to calculate to estimate the state quantity Zm by the following formula 8 that is a vector function using the two-dimensional coordinate positions xm, ym, and the yaw angle θm of the vehicle 4.

$$Z_m = \begin{bmatrix} x_m \\ y_m \\ \theta_m \end{bmatrix} \quad \text{(Formula 8)}$$

The parameter correction block 140 shown in FIG. 2 is configured to correct the dynamic parameter pt based on an offset amount δz that is the difference between the state quantity Zm observed by the MM block 120 and the state quantity Zt estimated by the dead reckoning. The parameter correction block 140 includes a minimization sub-block 142 and an adjustment sub-block 144.

The state quantity Zt at the latest time t estimated by the DR block 100 and the state quantity Zm at the latest time t observed by the MM block 120 are input to the minimization sub-block 142. The minimization sub-block 142 acquires the offset amount δz that is the difference between the observed state quantity Zm and the estimated state quantity Zt by the following formula 9.

$$\delta z = Z_m - Z_t \quad \text{(Formula 9)}$$

Figure 7:
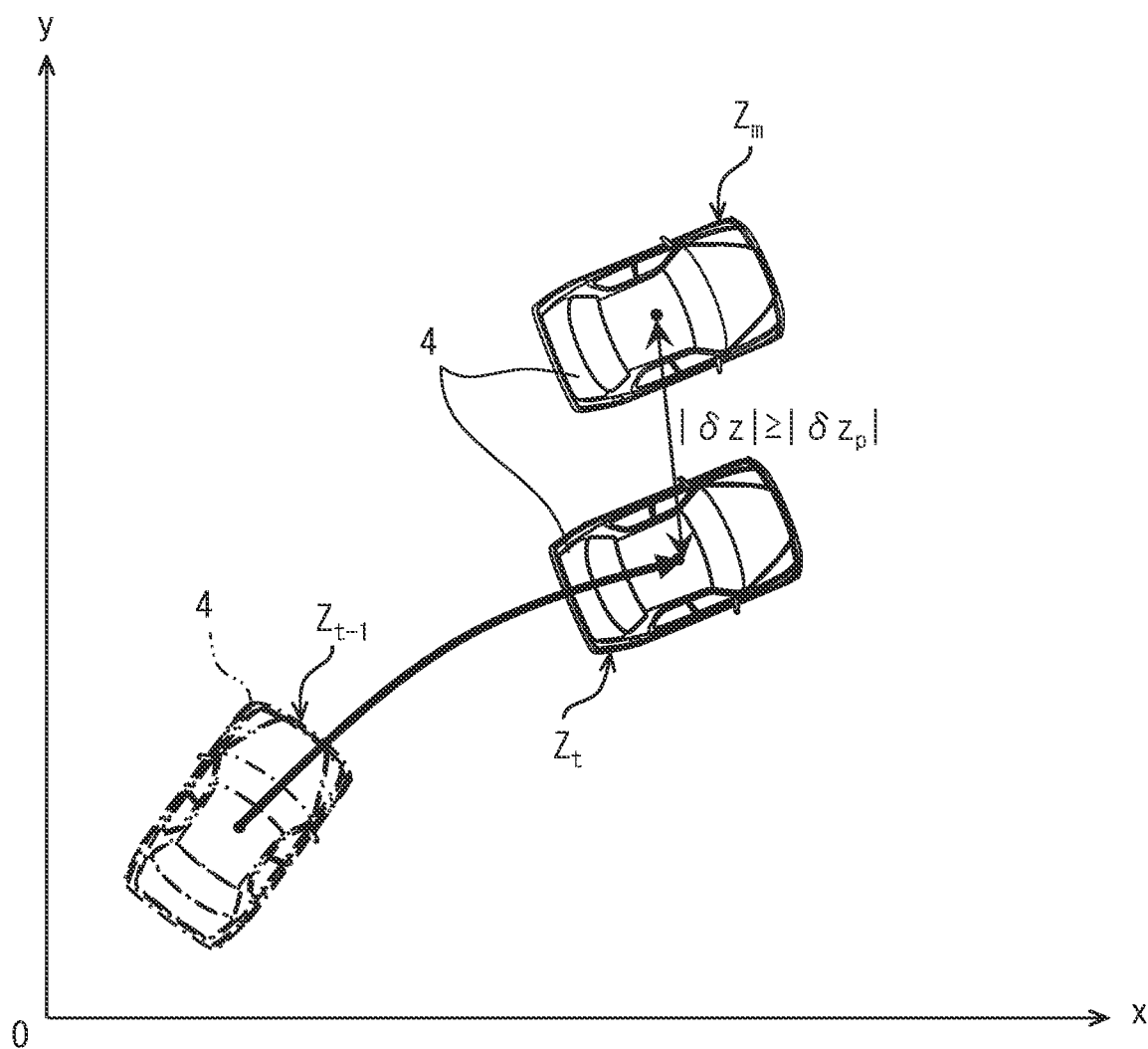
FIG. 7 is a schematic diagram for explaining a parameter correction block according to the embodiment.

The minimization sub-block 142 predicts a deviation δzp included in the acquired offset amount δz as shown in FIG. 7. The deviation δzp is the difference, due to the change amount δp of the dynamic parameter pt, from the state quantity Zt of the latest time t estimated by the DR block 100. Specifically, the deviation δzp, which is defined by the following formula 10, is the difference between the change amount function ΔZ including, as a variable, the dynamic parameter pt of the latest time t and the change amount function ΔZ including, as a variable, the dynamic parameter pt−1 of the preceding estimation time t−1. The formula 10 is transformed into the following formula 11 using the change amount δp between the dynamic parameter pt at the latest time t and the dynamic parameter at the preceding estimation time pt−1. The deviation δzp may be approximated by the following formula 12 as the value of the change amount function ΔZ including, as a variable, the change amount δp between the dynamic parameter pt at the latest time t and the dynamic parameter pt−1 at the preceding estimation time t−1.

$$\delta z_p = \Delta Z(p_t) - \Delta Z(p_{t-1}) \quad \text{(Formula 10)}$$

$$\delta z_p = \Delta Z(p_{t-1} + \delta_p) - \Delta Z(p_{t-1}) \quad \text{(Formula 11)}$$

$$\delta z_p = \Delta Z(\delta p) \quad \text{(Formula 12)}$$

The dynamic parameter pt−1 of the preceding estimation time t−1 is read out from the storage space 180 in the memory 10 and input to the minimization sub-block 142. According to this input, the minimization sub-block 142 acquires the deviation δzp that minimizes the absolute value of the difference (absolute difference) from the offset amount δz by optimization using the minimization function Ma of the following formula 13. The minimization sub-block 142 further acquires the optimum value of the change amount δp corresponding to the deviation δzp by assigning the dynamic parameter pt−1 to the formulas 11 or the formula 12.

$$M_a = \text{argmin} |\delta z - \delta z_p| \quad \text{(Formula 13)}$$

The dynamic parameter pt−1 of the preceding estimation time t−1 is read out from the storage space 180 and input to the adjustment sub-block 144 shown in FIG. 2. The optimum value of the change amount δp corresponding to the deviation δzp and predicted by the minimization sub-block 142 is input to the adjustment sub-block 144. Based on these inputs, the adjustment sub-block 144 acquires the dynamic parameter pt of the latest time t by the following formula 14 using Kalman-gain Kp along with the dynamic parameter pt−1 of the preceding estimation time t−1 and the optimum value of the change amount δp. According to this, the dynamic parameter pt is corrected using the optimum value of the change amount δp by passing through the Kalman filter. The adjustment sub-block 144 stores the corrected dynamic parameter pt to the storage space 180 in association with the latest time t, and feeds it back for the dead reckoning performed by the DR block 100 as the dynamic parameter used at the next estimation.

$$p_t = K_p \cdot p_{t-1} + (1 - K_p) \cdot (p_{t-1} + \delta p) \quad \text{(Formula 14)}$$

The error compensation block 160 shown in FIG. 2 compensates for the error in the state quantity Zt estimated by the DR block 100 by filtering based on the state quantity Zm observed by the MM block 120.

Specifically, the state quantity Zt at the latest time t estimated by the DR block 100 and the state quantity Zm at the latest time t observed by the MM block 120 are input to the error compensation block 160. Based on these inputs, the error compensation block 160 compensates for the error in the state quantity Zt estimated by the DR block 100 by the following formula 15 using the state quantity Zm observed by the MM block 120 and the Kalman-gain Kz. That is, the estimated state quantity Zt is confirmed by fusing the observed state quantity Zm through the Kalman filter. The estimated state quantity Zt that has confirmed by the error compensation is output from the error compensation block 160 and used for the advanced driver assistance or the automated driving of the vehicle 4, for example.

$$Z_t \leftarrow (1 - K_z) \cdot Z_t + K_z \cdot Z_m \quad \text{(Formula 15)}$$

Figure 8:
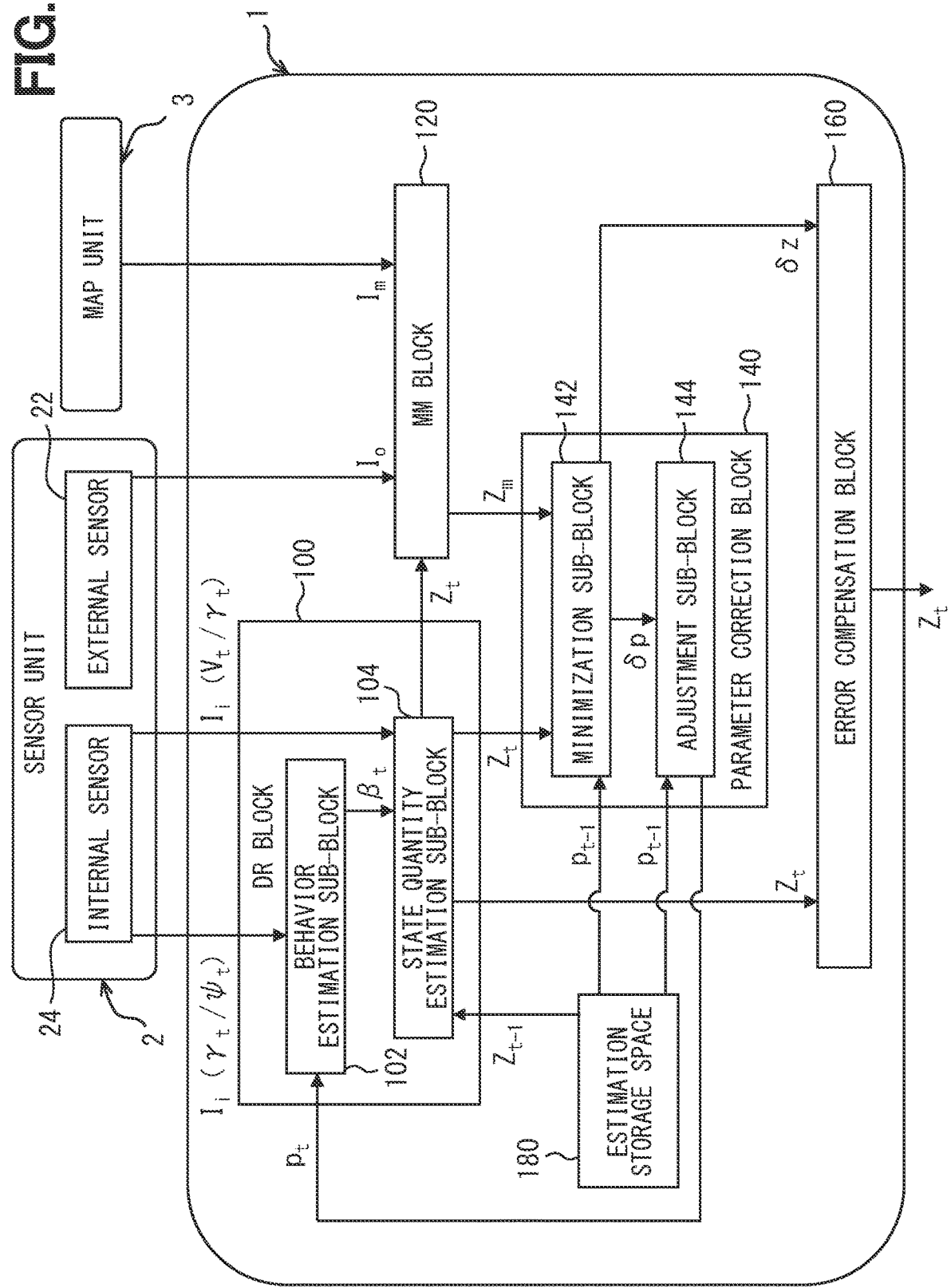
FIG. 8 is a block diagram showing a detailed configuration of an estimation device according to one modification example of the embodiment.
Figure 9:
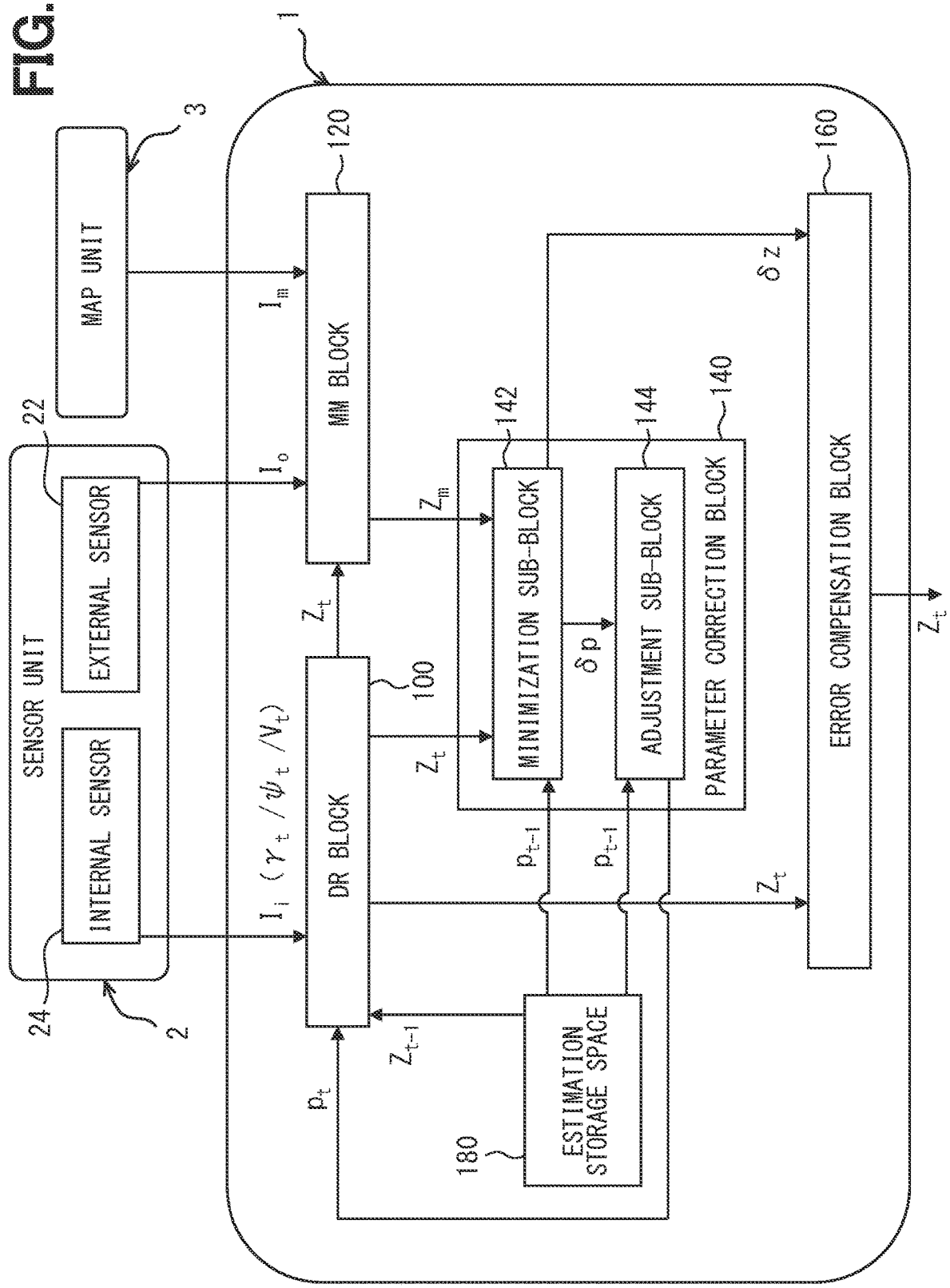
FIG. 9 is a block diagram showing a detailed configuration of an estimation device according to one modification example of the embodiment.

The formula 15 can be transformed into the following formula 16 using the offset amount δz. In modification examples shown in FIGS. 8, 9, the error compensation block 160 may compensate for the error in the state quantity Zt estimated by the DR block 100 by the following formula 16 using the value δz acquired by the minimization sub-block 142 and the Kalman-gain Kz. FIG. 8 shows the modification example of the configuration shown in FIG. 2. FIG. 9 shows the modification example of the configuration shown in FIG. 5.

$$Z_t \leftarrow (1 - K_z) \cdot Z_t + K_z \cdot (Z_t + \delta z) \quad \text{(Formula 16)}$$

In the present embodiment, the DR block 100 corresponds to the dead reckoning unit, and the MM block 120 corresponds to the map matching unit. In the first embodiment, the parameter correction block 140 corresponds to the parameter correction unit, and the error compensation block 160 corresponds to the error compensation unit.

Figure 10:
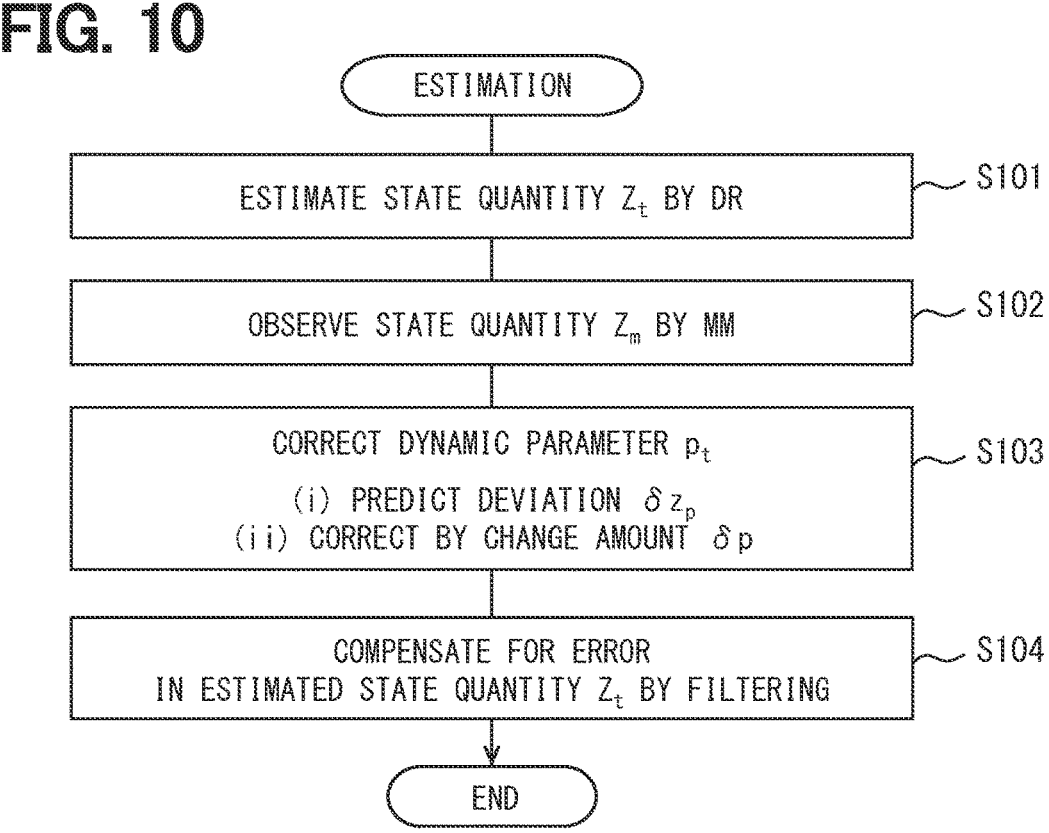
FIG. 10 is a flowchart illustrating an estimation method according to the embodiment.

The flow of the estimation method for estimating the state quantity of the vehicle 4 performed by the estimation device 1 will be described with reference to FIG. 10. The estimation method is jointly performed by the functional blocks 100, 120, 140, 160 of the estimation device 1. This flow is performed at each estimation timing when the vehicle 4 requires the estimation. Further, in this flow, "S" means steps of the process executed by instructions included in the estimation program.

In S101, the DR block 100 estimates the state quantity Zt of the vehicle 4 by the dead reckoning based on the dynamics model DM including the dynamic parameter pt that changes the vehicle behavior and the internal information Ii acquired from the inside of the vehicle 4. In S102, the MM block 120 observes the state quantity Zm of the vehicle 4 by the map matching based on the map information Im indicative of the traveling environment of the vehicle 4 and the external information Io acquired from the outside of the vehicle 4.

In S103, the parameter correction block 140 corrects the dynamic parameter pt based on the offset amount δz that is the difference between the state quantity Zm observed in S102 and the state quantity Zt estimated in S101. The parameter correction block 140 corrects the dynamic parameter pt that varies depending on factors other than the vehicle behavior. The dynamic parameter pt contains the kinetic friction coefficient of the road surface on which the vehicle 4 is traveling. The parameter correction block 140 predicts the deviation δzp contained in the offset amount δz. The deviation δzp is the difference, due to the change amount δp of the dynamic parameter pt, from the state quantity Zt estimated by the dead reckoning. The parameter correction block 140 predicts the deviation δzp so as to minimize the absolute value of the difference between the offset amount δzp and the offset amount δz. The parameter correction block 140 corrects the dynamic parameter pt using the optimum value of the change amount δp corresponding to the predicted deviation δzp. The parameter correction block 140 feeds back the corrected dynamic parameter pt to the DR block 100 for the dead reckoning performed in S101 of the next flow.

Figure 11:
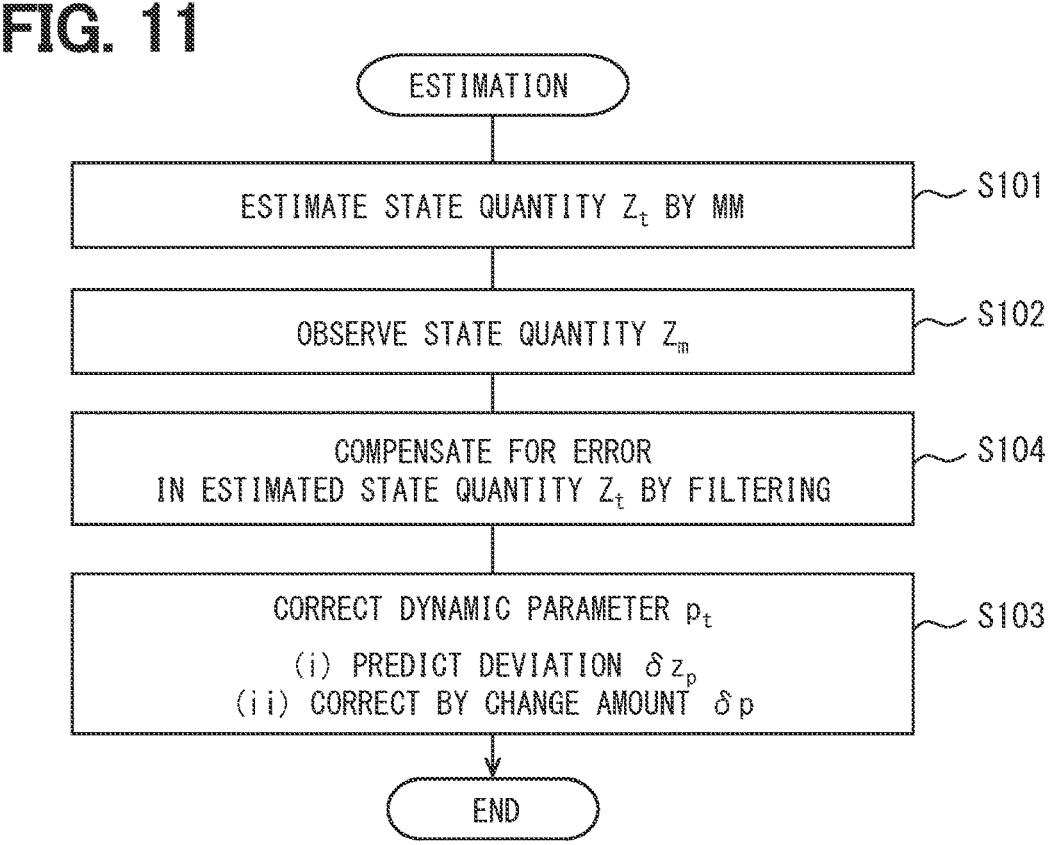
FIG. 11 is a flowchart illustrating an estimation method according to one modification example of the embodiment.
Figure 12:
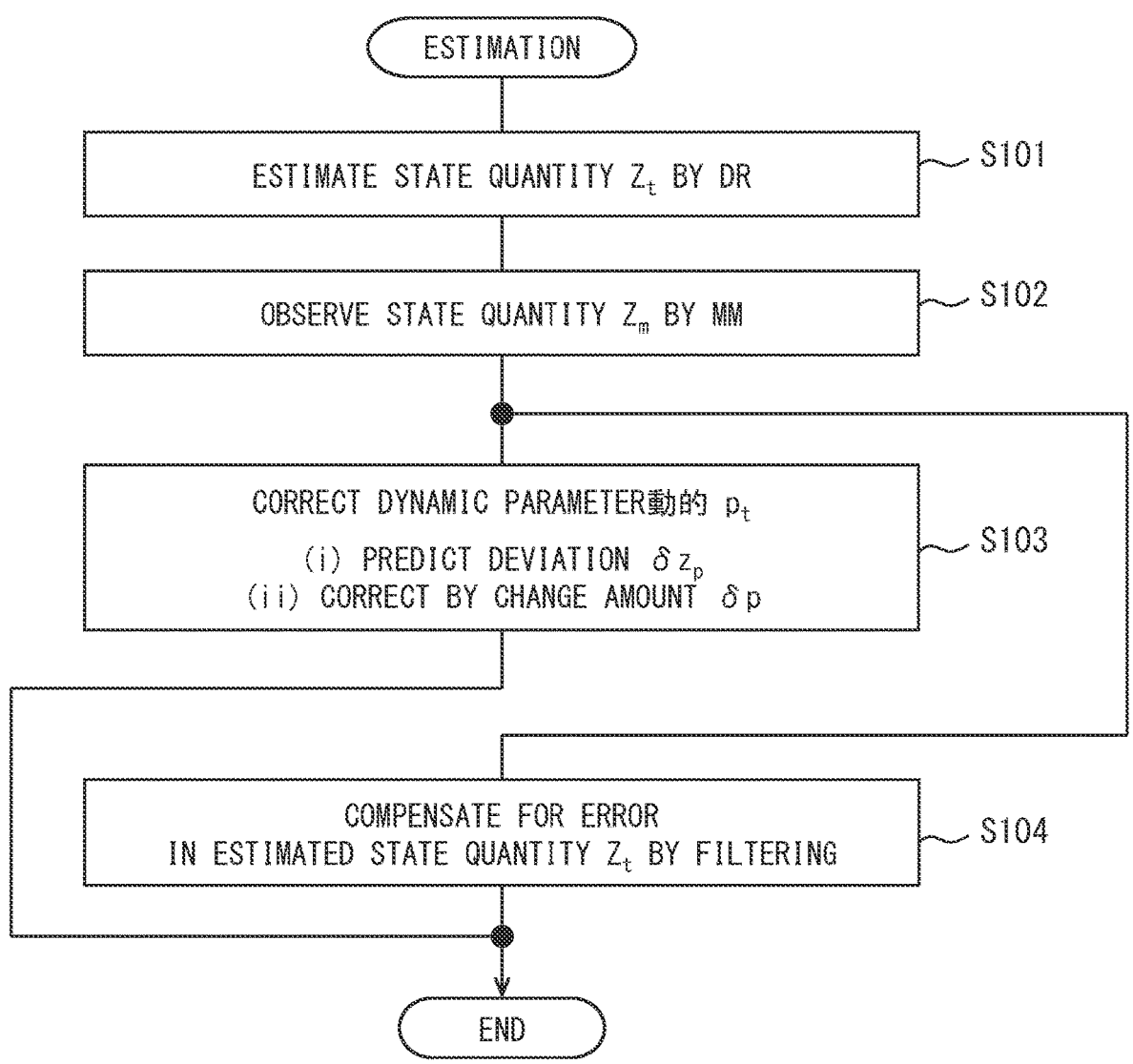
FIG. 12 is a flowchart illustrating an estimation method according to one modification example of the embodiment.

In S104, the error compensation block 160 compensates for the error in the state quantity Zt estimated in S101 by filtering based on the state quantity Zm observed in S102. Then, the current execution of the flow ends. S103 and S104 may be performed in this order as shown in FIG. 10. S103 and S104 may be performed in reversed order as shown in FIG. 11 showing a modification example. S103 and S104 may be simultaneously and parallelly performed as shown in FIG. 12 showing another modification example.

In the present embodiment, S101 corresponds to the dead reckoning process, and S102 corresponds to the map matching process. In the present embodiment, S103 corresponds to the parameter correction process, and S104 corresponds to the error compensation process.

(Effects)

The functions and effects in the present embodiment described above will be explained below.

According to the present embodiment, the correction of the dynamic parameter pt that changes the vehicle behavior is performed based on the offset amount δz that is the difference between the state quantity Zm observed by the map matching and the state quantity Zt estimated by the dead reckoning. Accordingly, the dynamic parameter pt can be accurately corrected and fed back for the dead reckoning. Accordingly, based on the dynamics model including the fed back dynamic parameter pt, the accuracy in the estimation of the state quantity Zt by the dead reckoning can be improved.

According to the present embodiment, the deviation δzp contained in the offset amount δz and being the difference, due to the change amount δp of the dynamic parameter pt, from the state quantity Zt estimated by the dead reckoning is predicted, and the dynamic parameter pt is corrected using the change amount Op corresponding to the predicted deviation δzp. According to this correction, the dynamic parameter pt that accurately reflects the change amount δp causing the offset amount δz can be fed back to the dead reckoning. Accordingly, based on the dynamics model including the fed back dynamic parameter pt, the accuracy in the estimation of the state quantity Zt by the dead reckoning can be improved.

According to the present embodiment, the change amount δp corresponding to the deviation δzp that minimizes the difference from the offset amount δz can bring the estimated state quantity Zt to be close to the observed state quantity Zm by the dead reckoning based on the dynamics model DM that contains the dynamic parameter pt corrected by the change amount δp. That is, the accuracy in the estimation of the state quantity Zt by the dead reckoning can be improved.

According to the present embodiment, the dynamic parameter pt that may vary depending on the factors other than the vehicle behavior, such as the dynamic parameter pt including the kinetic friction coefficient of the road surface on which the vehicle is traveling, is corrected based on the offset amount δz. According to this correction, the dynamic parameter pt that may include an error due to the change amount (i.e. change amount δp) caused by the factors other than the vehicle behavior can be corrected. Accordingly, based on the dynamics model DM including the fed back dynamic parameter pt, the accuracy in the estimation of the state quantity Zt by the dead reckoning can be improved.

According to the present embodiment, the error in the state quantity Zt estimated by the dead reckoning can be compensated by filtering based on the state quantity Zm observed by the map matching. According to this error compensation and the dynamics model DM including the dynamic parameter pt that is fed back in response to the correction based on the offset amount δz, the accuracy in the estimation of the state quantity Zt can be further improved.

OTHER EMBODIMENTS

Although the embodiment has been described above, the present disclosure should not be limited to the above embodiment and may be applied to various other embodiments and various combinations of the embodiments within the scope of the present disclosure.

Specifically, the dedicated computer of the estimation device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

According to the estimation device 1 of a modification example, the state quantity Zt, Zm may include physical quantity relating to the vehicle such as the velocity in addition to or instead of the yaw angles θt, θm. According to the estimation device 1 of a modification example, instead of the weighting calculation using Kalman filter, the dynamic parameter pt may be corrected in the parameter correction block 140 and S103 by adding the change amount δp from the dynamic parameter pt−1 of the preceding estimation time t−1.

According to the estimation device 1 of a modification example, the process executed by the error compensation block 160 in S104 may be performed such that the error in the state quantity Zt estimated by the DR block 100 in S101 is compensated based on the state quantity estimated by a method different from the above method performed by the MM block 120 in S102. According to the estimation device 1 of a modification example, the error compensation block 160 and S104 may be omitted, and the state quantity Zt estimated by the DR block 100 in S101 may be output as the confirmed value.

What is claimed is:

1. An estimation device configured to estimate a state quantity including a position of a vehicle, the estimation device comprising:
   a dead reckoning unit configured to estimate the state quantity by dead reckoning based on (i) a dynamics model including a parameter that causes a change in a behavior of the vehicle and (ii) internal information acquired from an inside of the vehicle;
   a map matching unit configured to observe the state quantity by map matching based on (i) map information indicative of a traveling environment of the vehicle and (ii) external information acquired from an outside of the vehicle; and
   a parameter correction unit configured to correct the parameter, which is to be fed back for the dead reckoning, based on an offset amount that is a difference between the state quantity observed by the map matching and the state quantity estimated by the dead reckoning; and an error compensation unit configured to compensate for an error in the state quantity estimated by the dead reckoning by filtering based on the state quantity observed by the map matching, wherein the dead reckoning unit is further configured to estimate the state quantity based on the parameter fed back after correction by the parameter correction unit, and the map matching unit is further configured to perform map matching based on the parameter fed back after the correction, wherein the map matching unit is further configured to acquire the map information, the external information, and the state quantity which has been estimated by the dead reckoning unit, and observe the state quantity by map matching, wherein the dead reckoning unit is further configured to acquire the parameter which has been corrected by the parameter correction unit, cause the dynamics model to contain the parameter corrected as a parameter that causes the change in the behavior of the vehicle, acquire the dynamics model containing the corrected parameter and the internal information, and estimate the state quantity by the dead reckoning based on the internal information, wherein the parameter correction unit is configured to:
predict a deviation that is contained in the offset amount and is a difference, caused by a change amount of the parameter, between the state quantity observed by the map matching and the state quantity estimated by the dead reckoning; and correct the parameter using the change amount corresponding to the predicted deviation, wherein the parameter correction unit predicts, as a change amount function $\delta z_p$, the deviation which is the difference caused by the change amount of the parameter based on at least one of the following formulas:

$$\delta z_p = \Delta Z(p_t) - \Delta Z(p_{t-1});$$

$$\delta z_p = \Delta Z(p_{t-1} + \delta p) - \Delta Z(p_{t-1}); \text{ and}$$

$$\delta z_p = \Delta Z(\delta p), \text{ and}$$

wherein:
pt represents a dynamic parameter at a time t;
pt−1 represent a dynamic parameter at a time t−1, which is previous time of the time t; and
δp represents the change amount from the dynamic parameter pt−1 at the time t−1 to the dynamic parameter pt at the time t, and wherein:
the state quantity of which the error has been compensated by the error compensation unit is output to an electronic control device configured to execute an advanced driver assistance or an automated driving of the vehicle; and
the electronic control device controls the vehicle to execute the advanced driver assistance or the automated driving.

2. The estimation device according to claim 1, wherein the parameter correction unit is configured to predict the deviation that minimizes a difference between the deviation and the offset amount.

3. The estimation device according to claim 1, wherein the parameter correction unit is configured to correct the parameter that varies depending on a factor other than the behavior of the vehicle.

4. The estimation device according to claim 3, wherein the parameter correction unit is configured to correct the parameter that contains a kinetic friction coefficient of a road surface on which the vehicle is traveling.

5. The estimation device according to claim 1, wherein:
the parameter correction unit receives the state quantity estimated by the dead reckoning unit and the state quantity observed by the map matching unit to correct the parameter causing the change in the behavior of the vehicle and transmits the corrected parameter to the dynamics model in the dead reckoning unit.

6. A method of estimating a state quantity including a position of a vehicle, the method comprising:
estimating the state quantity by dead reckoning based on (i) a dynamics model including a parameter that causes a change in a behavior of the vehicle and (ii) internal information acquired from an inside of the vehicle;
observing the state quantity by map matching based on (i) map information indicative of a traveling environment of the vehicle and (ii) external information acquired from an outside of the vehicle;
correcting the parameter, which is to be fed back for the dead reckoning, based on an offset amount that is a difference between the state quantity observed by the map matching and the state quantity estimated by the dead reckoning;
compensating for an error in the state quantity by filtering based on the state quantity observed by the map matching;
estimating the state quantity based on the parameter fed back after correction; and
performing map matching based on the parameter fed back after the correction, wherein
the map information, the external information, and the state quantity, which has been estimated, are acquired, and the state quantity is observed by map matching,
the parameter which has been corrected is acquired, the dynamics model is caused to contain the parameter corrected as a parameter that causes the change in the behavior of the vehicle, the dynamics model containing the corrected parameter and the internal information are acquired, and the state quantity is estimated by the dead reckoning based on the internal information, wherein the method further comprises:
predicting a deviation that is contained in the offset amount and is a difference, caused by a change amount of the parameter, between the state quantity observed by the map matching and the state quantity estimated by the dead reckoning; and
correcting the parameter using the change amount corresponding to the predicted deviation, wherein the deviation is predicted, as a change amount function $\delta z_p$, which is the difference caused by the change amount of the parameter based on at least one of the following formulas:

$$\delta z_p = \Delta Z(p_t) - \Delta Z(p_{t-1});$$

$$\delta z_p = \Delta Z(p_{t-1} + \delta p) - \Delta Z(p_{t-1}); \text{ and}$$

$$\delta z_p = \Delta Z(\delta p), \text{ and}$$

wherein:
pt represents a dynamic parameter at a time t;
pt−1 represent a dynamic parameter at a time t−1, which is previous time of the time t; and
δp represents the change amount from the dynamic parameter pt−1 at the time t−1 to the dynamic parameter $p_t$ at the time t, and wherein:
the state quantity of which the error has been compensated is output to an electronic control device configured to execute an advanced driver assistance or an automated driving of the vehicle; and
the electronic control device controls the vehicle to execute the advanced driver assistance or the automated driving.

7. The method according to claim 6, wherein
correcting the parameter includes predicting the deviation that minimizes a difference between the deviation and the offset amount.

8. The method according to claim 6, wherein
correcting the parameter includes correcting the parameter that varies depending on a factor other than the behavior of the vehicle.

9. The method according to claim 8, wherein
correcting the parameter includes correcting the parameter that contains a kinetic friction coefficient of a road surface on which the vehicle is traveling.

10. The method according to claim 6, further comprising:
compensating for an error in the state quantity estimated by the dead reckoning by filtering based on the state quantity observed by the map matching.

11. A non-transitory computer readable storage medium storing a computer program for estimating a state quantity including a position of a vehicle, the computer program comprising instructions configured to, when executed by at least one processor, cause the at least one processor to:
estimate the state quantity by dead reckoning based on (i) a dynamics model including a parameter that causes a change in a behavior of the vehicle and (ii) internal information acquired from an inside of the vehicle;
observe the state quantity by map matching based on (i) map information indicative of a traveling environment of the vehicle and (ii) external information acquired from an outside of the vehicle;
correct the parameter, which is to be fed back for the dead reckoning, based on an offset amount that is a difference between the state quantity observed by the map matching and the state quantity estimated by the dead reckoning;
estimate the state quantity based on the parameter fed back after correction; and
perform map matching based on the parameter fed back after the correction,
wherein
the map information, the external information, and the state quantity, which has been estimated, are acquired, and the state quantity is observed by map matching,
the parameter which has been corrected is acquired, the dynamics model is caused to contain the parameter corrected as a parameter that causes the change in the behavior of the vehicle, the dynamics model containing the corrected parameter and the internal information are acquired, and the state quantity is estimated by the dead reckoning based on the internal information,
wherein the instructions are configured to, when executed by the at least one processor, further cause the at least one processor to:

predict a deviation that is contained in the offset amount and is a difference, caused by a change amount of the parameter, between the state quantity observed by the map matching and the state quantity estimated by the dead reckoning; and
correct the parameter using the change amount corresponding to the predicted deviation,
wherein the deviation is predicted, as a change amount function $\delta z_p$, which is the difference caused by the change amount of the parameter based on at least one of the following formulas:

$$\delta z_p = \Delta Z(p_t) - \Delta Z(p_{t-1});$$

$$\delta z_p = \Delta Z(p_{t-1} + \delta p) - \Delta Z(p_{t-1}); \text{ and}$$

$$\delta z_p = \Delta Z(Sp), \text{ and}$$

wherein:
pt represents a dynamic parameter at a time t;
pt−1 represent a dynamic parameter at a time t−1, which is previous time of the time t; and
δp represents the change amount from the dynamic parameter pt−1 at the time t−1 to the dynamic parameter pt at the time t, wherein:
the state quantity of which the error has been compensated is output to an electronic control device configured to execute an advanced driver assistance or an automated driving of the vehicle; and
the electronic control device controls the vehicle to execute the advanced driver assistance or the automated driving.

12. The non-transitory computer readable storage medium storing the computer program according to claim 11, wherein the instructions are configured to, when executed by the at least one processor, further cause the at least one processor to:
predict the deviation that minimizes a difference between the deviation and the offset amount.

13. The non-transitory computer readable storage medium storing the computer program according to claim 11, wherein the instructions are configured to, when executed by the at least one processor, further cause the at least one processor to:
correct the parameter that varies depending on a factor other than the behavior of the vehicle.

14. The non-transitory computer readable storage medium storing the computer program according to claim 13, wherein the instructions are configured to, when executed by the at least one processor, further cause the at least one processor to:
correct the parameter that contains a kinetic friction coefficient of a road surface on which the vehicle is traveling.

15. The non-transitory computer readable storage medium storing the computer program according to claim 11, wherein the instructions are configured to, when executed by the at least one processor, further cause the at least one processor to:
compensate for an error in the state quantity estimated by the dead reckoning by filtering based on the state quantity observed by the map matching.

16. An estimation device configured to estimate a state quantity including a position of a vehicle, the estimation device comprising:
a dead reckoning unit configured to estimate the state quantity by dead reckoning based on (i) a dynamics model including a parameter that causes a change in a behavior of the vehicle and (ii) internal information acquired from an inside of the vehicle;

a map matching unit configured to observe the state quantity by map matching based on (i) map information indicative of a traveling environment of the vehicle and (ii) external information acquired from an outside of the vehicle;

a parameter correction unit configured to correct the parameter, which is to be fed back for the dead reckoning, based on an offset amount that is a difference between the state quantity observed by the map matching and the state quantity estimated by the dead reckoning; and an error compensation unit configured to compensate for an error in the state quantity estimated by the dead reckoning by filtering based on the state quantity observed by the map matching, wherein the parameter correction unit is configured to correct the parameter that varies depending on a factor other than the behavior of the vehicle, the dead reckoning unit is further configured to estimate the state quantity based on the parameter fed back after correction by the parameter correction unit, and the map matching unit is further configured to perform map matching based on the parameter fed back after the correction, the map matching unit is further configured to acquire the map information, the external information, and the state quantity which has been estimated by the dead reckoning unit, and observe the state quantity by map matching, the dead reckoning unit is further configured to acquire the parameter which has been corrected by the parameter correction unit, cause the dynamics model to contain the parameter corrected as a parameter that causes the change in the behavior of the vehicle, acquire the dynamics model containing the corrected parameter and the internal information, and estimate the state quantity by the dead reckoning based on the internal information, wherein the parameter correction unit is configured to:
predict a deviation that is contained in the offset amount and is a difference, caused by a change amount of the parameter, between the state quantity observed by the map matching and the state quantity estimated by the dead reckoning; and correct the parameter using the change amount corresponding to the predicted deviation, wherein the parameter correction unit predicts, as a change amount function $\delta z_p$, the deviation which is the difference caused by the change amount of the parameter based on at least one of the following formulas:

$\delta z_p = \Delta Z(p_t) - \Delta Z(p_{t-1});$ $\delta z_p = \Delta Z(p_{t-1} + \delta p) - \Delta Z(p_{t-1});$ and $\delta z_p = \Delta Z(\delta_p),$ and wherein:
pt represents a dynamic parameter at a time t;
pt−1 represent a dynamic parameter at a time t−1, which is previous time of the time t; and
δp represents the change amount from the dynamic parameter pt−1 at the time t−1 to the dynamic parameter pt at the time t, and wherein:
the state quantity of which the error has been compensated by the error compensation unit is output to an electronic control device configured to execute an advanced driver assistance or an automated driving of the vehicle; and the electronic control device controls the vehicle to execute the advanced driver assistance or the automated driving.

* * * * *